2,932,613

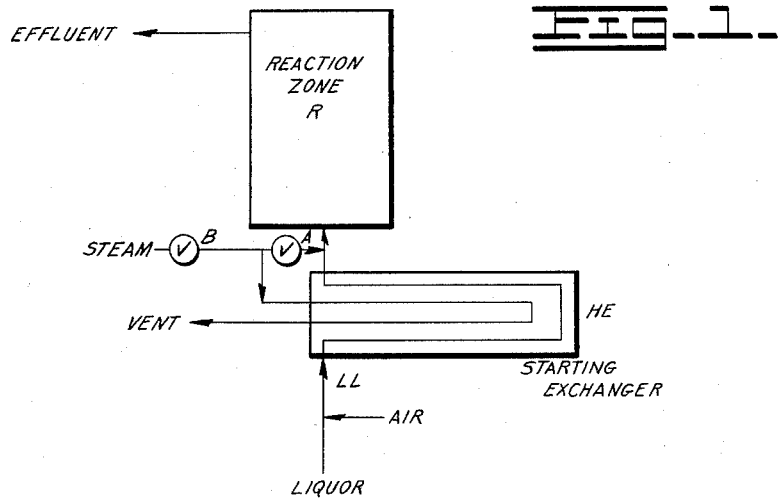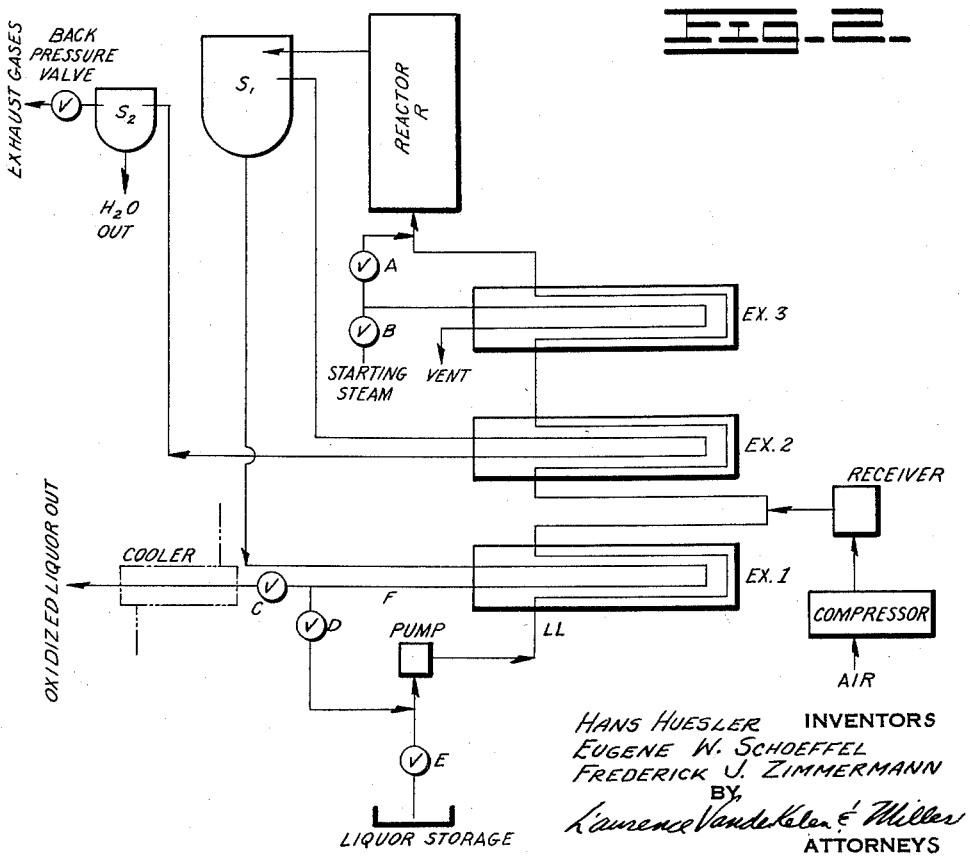

STARTING OXIDATION PROCEDURE

Hans Huesler, Rothschild, Eugene W. Schoeffel, Kronenwetter, and Frederick J. Zimmermann, Weston, Wis., assignors to Sterling Drug Inc., New York, N.Y., a corporation of Delaware Application January 24, 1955, Serial No. 483,581

8 Claims. (Cl. 210—63)

This invention relates to the starting of a continuous chemical reaction and is more particularly concerned with the initiation of large-scale continuous oxidation procedures using a starting temperature substantially less than that employed to maintain the reaction.

In United States Letters Patent 2,665,249, issued January 5, 1954, to Frederick J. Zimmermann, there is described a procedure which involves the autogenetic oxidation of organic materials dispersed in an aqueous medium. This procedure has met with substantial commercial acceptance. However, certain of the operating details have presented problems one of the foremost of which was the proper technique for starting. The patent states that the reaction mixture was heated to about 536 degrees Fahrenheit and the reactor was filled about two-thirds full of waste sulfite liquor. Thereafter air was introduced, and because the reactor and reactants were at the reaction temperature, a reaction resulted. However, the difficulty of providing equipment and means for heating a system to 536 degrees Fahrenheit will be apparent to those skilled in the design and operation of large-scale chemical process equipment. By the very nature of the oxidation procedure, certain insulation is normally employed to jacket the reactors and associated apparatus is required in order to prevent excess radiation loss as well as to maintain safety conditions around the reaction equipment. Thus, when oil rings, steam jackets, heating tubes, and other conventional apparatus were employed there were design problems which presented difficulties in the economic operation of the process.

It is, therefore, a principal object of the present invention to provide a process for the starting of continuous autogenetic liquid phase oxidation reactions. Still another object of the present invention is to provide a reactor design which allows for the internal heating of the reactants and reactors, whereby the reaction is initiated at substantially lower temperatures than would predictably be required. Still another object is to teach a method of starting and apparatus to accomplish starting which is of the simplest type wherein substantial starting fuel economies and where installational economies are realized. Another object of the present invention is to provide a process for starting an oxidation procedure which utilizes relatively low starting temperatures to start a continuous oxidation procedure. Still another object of the present invention is to provide a process for the oxidation of aqueous phase organic carbonaceous matter which uses a relatively simple and easily controlled initiation technique. Other objects will become apparent hereinafter.

It has been unexpectedly found, and is herein first described, that an oxidation procedure such as is described in United States Letters Patent 2,665,249, that is, continuous autogenetic liquid phase oxidation of combustible matter dispersed in water, may be readily accomplished by heating the input liquor to a temperature somewhat less than 392 degrees Fahrenheit, and less than the temperature at which the reaction normally occurs, but above approximately 280 degrees Fahrenheit. The pressure of the reactor will be maintained at about that maintained during the reaction when initiated and self-sustaining. Reactor pressures are obtained in the reactor by pumps and compressors. After the reactor and pipes are heated to this temperature, liquor which has been heated to a temperature above about 280 degrees Fahrenheit but less than the temperature at which the process becomes self-sustaining, is pumped into the reactor under about the normal reactor pressure, in the presence of at least a stoichiometric amount of an oxygen containing gas. Under given conditions of temperature and pressure, unexpectedly, it has been found that oxidation will be initiated sufficient to "trigger" the oxygenating process to self-sustaining conditions within a relatively short period of time and with great fuel economies. The oxidation being exothermic in nature will cause heating of the reactor and surrounding equipment. By leading the effluent therefrom in a heat exchange relationship with the incoming liquor and gas, a gradual temperature increase to the operating temperature can be obtained. After the reaction has been initiated, the steam or other heating means is gradually shut off and the reaction proceeds independent of heat applied from an external source.

In the drawing:

Figure 1 is a schematic circuit diagram showing the basic starting apparatus.

Figure 2 is a schematic circuit diagram illustrating the starting process and apparatus as it appears in an actual process installation.

For ease of discussion and simplicity in explanation, reference is made to the accompanying drawing which shows a typical layout for an oxidation procedure such as is described in United States Letters Patent 2,665,249, wherein a preheater arrangement is provided for the incoming liquor. Liquor under a pressure of approximately that at which the normal reaction occurs, or at least sufficient pressure to cause it to enter the reactor, is run in a heat exchange relationship with a suitable unit for supplying heat from an external source whereby the liquor is raised in temperature above about 280 degrees Fahrenheit, but to a temperature less than that at which the reaction normally occurs within the reactor. Simultaneously with the introduction of liquor, air is introduced at a pressure in excess of that amount at which the reaction normally proceeds. The preheated aqueous dispersion of combustible material and air is passed into the reactor which has been raised to a temperature above approximately 280 degrees Fahrenheit. Desirably, this heating of the reactor may be accomplished prior to the introduction of the liquor by passage of steam therethrough. However, where recycling of the liquor does not present a problem or the waste disposal problem is not present, the liquor which has been preheated prior to introduction into the reactor can be used as heating medium for the reactor. As temperature and pressure conditions within the reactor become favorable, oxidation will begin. This oxidation, once initiated and being exothermic in nature, causes a resultant heating of the reactor, and by recycling the reactor effluent, a heating of the incoming liquor and the reaction zone. Thus, the reaction has been started.

This "triggering effect" has been very unexpected, in view of the fact that most prior art techniques for the starting of continuous reaction procedures have required that the reactor and reactants be brought to reaction temperature before the reaction can proceed. In fact, in initial engineering for the commercial use of the process as described in United States Letters Patent 2,665,249, elaborate installations were developed which would allow a heating of the reactor and the incoming liquor to the reaction temperature. It was therefore unexpected to find that one could introduce the reactants at a mere 280 to 356 degrees Fahrenheit into a cold reactor, or reactor at temperatures of no more than 280 to 356 degrees Fahrenheit, and have the reaction accelerate to rapid self-sustaining conditions. Simplicity in equipment and in starting procedures was thus made possible.

As regards the oxidation technique, any aqueous organis dispersion which contains at least 3000 British thermal units per American gallon in the reaction zone may be autogenetically oxidized. This liquor is combined with an oxygen containing gas in an amount approximately sufficient to convert all the carbon to carbon dioxide, all the hydrogen to steam and the inorganic constituents to their stable oxides or salts of stable oxides under the conditions of reaction.

Figures 1 and 2 are schematic drawings illustrating the starting procedure and apparatus in a simple form. In Figure 1 a steam line carrying live steam at a temperature above 280 degrees Fahrenheit is admitted to the reactor liquor feed line LL and is branched to pass through a starting heat exchanger. Subsequently the steam is vented. With this unique arrangement steam is admitted directly to the reactor R and is placed in heat exchange relationship with the liquor supply line LL passing through heat exchanger HE. Thus the apparatus and reaction zone R are elevated in temperature prior to the admission of any aqueous dispersion of combustible material in liquor form.

As herein used, the term "liquor" means "an aqueous dispersion of combustible material," unless otherwise defined. The liquor is then admitted through the exchanger HE and raised in temperature to at least 280 degrees Fahrenheit as the liquor is passed through the steam heated starting exchanger. It will be observed that the flow of heating medium and liquor is countercurrent. Valve A is closed, shutting off the heating medium moving through the reactor as the liquor and air mixture is moved through the starting exchanger HE. The liquor and air mixture is admitted and elevated to the desired starting pressure in the reaction zone R. Oxidation will be observed to commence immediately, and increase in amount until the auxiliary starting steam or other heating medium is unnecessary and can be shut off. It will be observed in Figure 1 that the auxiliary steam from the exchanger is vented or the condensate discharged. It will be appreciated that this steam may be recycled or otherwise utilized as desired. Similarly, recycling of the liquor can be accomplished as will become apparent as the description proceeds. Figure 1 thus completely demonstrates the starting procedure and illustrates the required apparatus. It is to be noted that the apparatus components considered individually constitute items well known in chemical processing. It is the novel combination of apparatus utilized in starting autogenetic oxygenation that is believed to demonstrate inventive concepts.

In Figure 2 the invention is illustrated in a complete plant so that several important modification aspects are more clearly demonstrated when the starting is considered as a part of an operating plant. The starting exchanger is illustrated as exchanger 3 and it will be seen that valves A and B control admittance of heating media to either the reactor and associated apparatus or the exchanger 3 or both. Valve B is the master steam entry control. Valve A, when open, admits steam to the reactor. Valve A, when closed, shuts off steam to the reactor but does not interfere with the steam moved through the exchanger 3 and subsequently vented. When the process becomes self-sustaining the valve B is closed and exchanger 3 ceases to serve as a starter exchanger and becomes only a part of the conduit system moving the mixture of aqueous dispersion of combustible liquor and air to the reactor.

The function of valves C and D should be noted with respect to the starting of autogenetic oxygenation. When valve A is open and the master valve B is open it has been observed that steam is admitted to the reactor R. The steam from the reactor R then moves through the associated apparatus. The steam passes through separator $S_1$, where the vapor serves to heat exchanger 2. The condensate from separator $S_1$ serves to heat exchanger 1. With valve C open the condensate is ultimately exhausted. The vapors leaving heated exchanger 2 are passed to separator $S_2$ where the condensate is dropped out and vapor is vented. When the apparatus has been warmed to a temperature above at least 280 degrees Fahrenheit, the valve A is closed and the pump commences to move liquor into the liquor line LL. The liquor moves through exchanger 1 and is elevated in temperature from the storage temperature. Between exchanger 1 and exchanger 2 compressed air is admitted to the liquor line LL and as the mixture of air and liquor moves through exchanger 2 the temperature of the liquor-air mixture is further elevated. The liquor-air mixture passes through exchanger 3 in heat exchanger relationship with the starting heat media and he temprature is still further elevated. The liquor and air mixture enters the reactor R where some oxidation commences. The exothermic character of the reaction boosts the temperature of the liquor and air mixture. By closing valve C and opening valve D the liquor-air mixture is recycled in a closed circuit when valve E is also closed and the recycling of the already reacting liquor at building autogenic pressure brings about further heating. The exothermic heat is thus materially contributing to a thermal elevation of the material being recycled. As the temperature of the cycling mixture of air and liquor reaches a point in excess of 280 degrees Fahrenheit the oxygenation is preceeding at a rate which will sustain the process and the starting steam is then no longer required. Valve B is closed and valve E is opened permitting fresh liquor to enter the system. Valve D is closed and cycling ceases while valve C is opened and the process is on stream.

It has been demonstrated that the oxygenation process has been "triggered" by an external amount of heat substantially less than required to bring full autogenetic conditions to the filled reactor. The balance of the heat is obtained from the earliest oxidation within the system. The starting process is closed and the material recycled until operating conditions obtain. The fractional amount of total oxidation is utilized progressively to self-excite ultimate autogenetic thermal conditions.

In operation, a liquor having a fuel value of at least 3000 British thermal units per gallon, upon entry to the reaction zone, when raised to a temperature above about 280 degrees Fahrenheit and below the autogenetic temperature at which self-sustaining continuous oxidation proceeds, was "triggered" into autogenetic oxidation by recycling the heated liquor while applying external heat. As the exothermic heat became available the external heat was gradually diminished and ultimately shut off.

The apparatus of Figure 2 is characteristic of a process for autogenetic liquid phase oxygenation of combustible materials dispersed in water. The waste liquors such as spent pulping effluents, sewage, or finely comminuted garbage, or other combustibles, as illustrations, are stored or conducted directly to a pump capable of establishing and maintaining the necessary operating pressure within the continuous process. The valve E is provided in the pumping line so that the supply of fresh liquor may be stopped in order to accomplish a closed circuit recycling of liquor. Such recycling is accomplished, as will be seen, when valve E is closed, valve C is closed, and valve D is opened. Valve D permits conduit communication of liquor, and air in a closed circuit to the pump. The liquor and air then proceeds serially though a plurality of heat exchangers, exchanger 1, exchanger 2, and exchanger 3, and air supplied by a compressor at a pressure in excess of the autogenetic pressure is admitted to the flowing liquor. An air receiver is normally employed between the compressor and the liquor line LL and the air admitted supplies at least the stoichiometric oxygen demand of the reaction. The heat for the exchangers 1 and 2 is obtained by the hot effluent fluids, or hot effluent liquids, or hot effluent gases and vapors, as will be more clearly seen as the description proceeds. A starting exchanger (exchanger 3) is supplied with heat from an external source such as steam. When the process is self-sustaining the exchanger 3 becomes a mere conduit for liquor moving into the reactor R or reaction zone. Substantially complete oxidation occurs within the reactor R, balancing the continuous input of fresh liquor and air. Shut-off for the starting steam to exchanger 3 and to the reactor R is accomplished by the valve B in the steam supply conduit. The valve A is provided, as previously mentioned to independently shut off steam to the reactor R and associated apparatus. As the reaction proceeds, gaseous, liquid, and/or solid components comprise the reaction effluent. This combined effluent flows from the reactor R and into separator $S_1$ where the vapors and liquids are separated. The hot vapors move by suitable conduits into heat exchanger 2 in countercurrent heat exchange relationship with the incoming liquor and gas mixture. The cooled reactor effluent vapors and gases flow from the exchanger 2 to the separator $S_2$ where liquid is dropped out and the exhaust gases are vented. The back pressure valve is set on the gas exhaust line as indicated and maintains constant operating pressure within the oxygenating process. The liquid fraction of the effluent from the reactor R is separated in separator $S_1$ and moves by suitable conductors into heat exchanger 1 in heat exchange relationship with the incoming liquor. When the liquid heating material exits from the exchanger 1 it is exhausted as indicated through line F. A cooler is shown in phantom line although power equipment of suitable design may utilize the energy of the outflowing oxidized liquor. Similarly, although the exhaust gases are shown as being vented they may be utilized to power suitably designed energy transferring and transmitting apparatus, as for example turbines, expanders, and turbo generators.

It is to be noted that when the oxygenating process is on stream the ash comprising inorganic residue is in soluble or slurry form with the exhausting oxidized liquor. Chemical recovery can be employed in extractional treatment of the exhausted liquid if the oxidized liquor contains worthwhile fractions. Also worthy of note is that no scrubbers are necessary for the removal of precipitate material and after months of operation very little scaling has been observed in the apparatus and conduits of the process apparatus.

Since heat economy is to be rigidly practiced, suitable insulation sheaths are provided surrounding all of the equipment.

In the employment of the indicated starting process and apparatus it is material to observe that a cold reactor can be "triggered" into starting in an average time of about one hour. The following data indicates a typical starting run series of conditions, where the readings were taken at approximately fifteen minute intervals:

*Starting run data*

Desired operating conditions—Constant 820 pounds per square inch gauge; constant 490 degrees Fahrenheit (approximate temperature of reactor effluent).
Starting steam—150 pounds per square inch gauge; approximately 358 degrees Fahrenheit.
Reactor and associated apparatus warmed with starting steam.
Steam to reactor system cut off and liquor flow commenced with air mixture.
Liquor rate 38 gallons per minute of semi-chemical paper mill waste having a fuel content of about 5600 British thermal units per gallon.
Air rate—82 pounds per minute elevated to 134 pounds per minute when on stream.

| Time | 10:30 a.m. | 10:45 a.m. | 11:00 a.m. | 11:15 a.m. | 11:30 a.m. | 11:45 a.m. | 2:00 p.m. |
|---|---|---|---|---|---|---|---|
| Air Receiver ° F | 223 | 230 | 241 | 250 | 255 | 260 | 280 |
| Liquor After Ex. 1 ° F | 148 | 151 | 151 | 153 | 251 | 281 | 388 |
| Recycle Liq. After Ex. 1 ° F | 215 | 206 | 190 | 177 | 212 | 250 | 257 |
| Liquor and Air Before Ex. 2 ° F | 176 | 182 | 187 | 185 | 227 | 245 | 275 |
| Liquor and Air After Ex. 2 ° F | 223 | 220 | 215 | 212 | 285 | 339 | 430 |
| Vapors Before Ex. 2 ° F | 362 | 358 | 351 | 345 | 337 | 337 | 474 |
| Vapors After Ex. 2 ° F | 208 | 210 | 205 | 201 | 277 | 327 | 442 |
| Liquor and Air After Ex. 3 ° F | 322 | 320 | 318 | 317 | 339 | 355 | 430 |
| Reactor Effluent ° F | 358 | 352 | 345 | 344 | 392 | 450 | 491 |
| Separator $S_1$ ° F | 369 | 365 | 355 | 347 | 343 | 357 | 480 |
| Separator $S_2$ ° F | 263 | 260 | 247 | 230 | 240 | 259 | 440 |

At approximately 11:45 a.m. the starting steam was cut completely off by closing valve B. At 11:45 a.m. the process was considered started.

The process then advanced without additional external heating to the run conditions indicated in 2:00 p.m. column.

That data was determined at the start of a routine run and the temperatures were observed in degrees Fahrenheit since the gauges employed were thus calibrated.

Where starting steam at approximately 280 degrees Fahrenheit was utilized for starting and where the conditions indicated starting run data for steam at 358 degrees Fahrenheit (as indicated in "run data" above) were otherwise present, a much longer time was required to "trigger" the process. Self-sustaining conditions were reached after about four hours when the starting steam was shut off. This time did not include time required to warm the apparatus in that the apparatus was at about 280 degrees Fahrenheit when the starting steam was admitted to the system.

While lower temperatures for starting are probably possible, the time element involved was believed to make them impractical.

Although steam has been described throughout as the particular starting heat medium it will be appreciated that any fluid at a temperature in excess of 280 degrees Fahrenheit will operate as satisfactorily. In most installations it has been found that plant steam lines are the most convenient source for starting.

Having thus described specific embodiments the present invention is directed to the starting method and apparatus. However, it is to be understood that certain modifications within the skill of the art are to be included limited only by the scope of the hereinafter appended claims.

We claim:

1. The process for starting a flameless continuous autogenetic oxygenating process, wherein an aqueous dispersion of combustible material having a fuel value of at least 3000 British thermal units per gallon is oxidized, the steps which include: heating from an external source a reaction zone to a temperature above about 280 degrees Fahrenheit but below that at which self-sustaining oxidation is to be conducted; heating from an external source a mixture of said aqueous dispersion of combustible material and air to a temperature above about 280 degrees Fahrenheit but below that at which self-sustaining oxidation proceeds; introducing said heated mixture to said heated reaction zone; leading at least a portion of effluent from said reaction zone to assist in warming additional input liquor; reducing the amount of external supplied heat to the said mixture as the reaction zone temperature increases; shutting off said supplied heat when flameless self-sustaining conditions are obtained substantially completely oxidizing the combustibles in said aqueous dispersion and discharging as a product of the process an aqueous liquid produced by said autogenous liquid phase oxidation of said aqueous dispersion.

2. The process for starting a flameless continuous autogenetic oxygenating process, wherein an aqueous dispersion of combustible material having a fuel value of at least 3000 British thermal units per gallon is oxidized, the steps which include: supplying heat from an external source to a mixture of air and aqueous dispersion of combustible material; admitting said warmed mixture to a reaction zone; recycling said mixture in a closed circuit while elevating the temperature of said mixture above about 280 degrees Fahrenheit but below that at which autogenetic oxidation proceeds; opening said closed circuit as flameless autogenetic oxidation proceeds; shunting at least a portion of the effluent product in heat exchange relationship with said incoming mixture; and shutting off the supply of external heat and discharging as a product of the process an aqueous liquid produced by said autogenous liquid phase oxidation of said aqueous dispersion.

3. An apparatus for starting a self-sustaining oxygenating process which includes: a heat exchanger; a liquor supply line leading to and through said heat exchanger; a heat supply line for admitting a heat medium to said exchanger in countercurrent flow and heat exchange relationship with said liquor supply line; a branch conduit from said heat supply line; a reactor; valve means selectively directing a controllable amount of heating medium through said heat supply line and said branch conduit; a reactor influent conduit which is a continuation of said liquor supply line leading liquor from said heat exchanger to said reactor and having an opening connecting with said branch conduit prior to entry into said reactor.

4. An apparatus for a self-sustaining oxygenating process for oxidizing an aqueous dispersion of combustible material in liquid phase which includes: at least one reactor; a pump delivering fuel through a connecting pipe line to said reactor; a purality of heat exchangers through which said aqueous dispersion of combustible material is passed in being delivered from said pump to said reactor, at least one of said heat exchangers being heated by a regulatable external heat source, and the others of said heat exchangers being heated by effluent from the reactor; a compressor delivering an oxygen containing gas into said aqueous dispersion of combustible material prior to entry into said reactor; a plurality of separators separating vapor and liquid fractions from the reactor effluent; a back pressure valve on a vapor discharge pipe line from said separators controlling the constant pressure in said process; and valve means for selectively and controllably delivering external heat to the one of said heat exchangers; and piping to complete the circuit indicated.

5. An apparatus for a self sustaining oxidation of an aqueous dispersion of combustible material in liquid phase which includes: a valve controlled supply line from a source of aqueous dispersion to a pump for delivering said aqueous dispersion under pressure to a feed pipe line passing through a plurality of heat exchangers at least one of said heat exchangers being heated by a regulatable external source of heat, said remaining heat exchangers being heated by a pipe line carrying effluent from a reactor, said feed pipe line discharging said aqueous dispersion into said reactor, a compressor for introducing an oxygen containing gas into said feed pipe line prior to discharging into said reactor, a valve controlled effluent line from said reactor, connected to said valve controlled feed line to said pump, between said valve and said pump, and valves on discharge lines from the apparatus to maintain a constant back pressure on the reactor whereby when the valve controlling the supply of aqueous dispersion in said feed line is closed and the valve on the effluent line from the reactor to the pump line is opened, the effluent from the reactor is recycled through the feed pipe line to said reactor.

6. The process for the continuous autogenetic liquid phase oxidation of an aqueous dispersion of oxidizable matter having a fuel value of at least 3000 British thermal units per gallon without concentration of said feed, the steps which include: heating from an external source such aqueous dispersion and oxygen containing gas to a temperature above about 280 degrees Fahrenheit; introducing the so-heated dispersion and air into a reaction zone; subjecting the so-heated dispersion to a pressure at which self-sustaining oxidation will occur; incrementally reducing the heat from said external source as the temperature in said reaction zone increases to self-sustaining oxidation and oxidizing substantially completely the combustibles in said dispersion; and, maintaining the preheating of the feed to the reaction zone by heat exchange with at least a portion of a reaction product from said reaction zone and discharging as a product of the process an aqueous liquid produced by said autogenous liquid phase oxidation of said aqueous dispersion.

7. The process for the continuous autogenetic liquid phase oxidation of an aqueous dispersion of oxidizable matter having a fuel value of at least 3000 British thermal units per gallon without concentration of said feed, the steps which include: heating from an external source such aqueous dispersion and oxygen containing gas to a temperature above about 280 degrees Fahrenheit; introducing the so-heated dispersion and air into a reaction zone; subjecting the so-heated dispersion to a pressure at which self-sustaining oxidation will occur; recycling the oxygen containing gas, dispersion mixture and reaction products from the reaction zone through the heating zone; incrementally reducing the heat from said external source as the temperature in said reaction zone increases to self-sustaining oxidation and oxidizing substantially completely the combustibles in said dispersion; and, maintaining the preheating of the feed to the reaction zone by heat exchange with at least a portion of a reaction product from said reaction zone and discharging as a product of the process an aqueous liquid produced by said autogenous liquid phase oxidation of said aqueous dispersion.

8. An apparatus for a self sustaining oxygenating process for oxidizing an aqueous dispersion of combustible material in liquid phase which includes: a pump for delivering said aqueous dispersion through a pipe line which passes through a plurality of heat exchangers and discharges said aqueous dispersion into a reactor; a discharge pipe line connecting said reactor to the first of a plurality of separators for separating liquid and vapor fractions; a valve controlled fluid heating line connected to one of said heat exchangers delivering a fluid heating medium to one of said heat exchangers; and back pressure valves on discharge pipe lines leading from said separator for maintaining a constant pressure on said reactor for supporting said self sustaining oxidizing process.

References Cited in the file of this patent

UNITED STATES PATENTS

| | | |
|---|---|---|
| 424,756 | Blackman | Apr. 1, 1890 |
| 2,213,052 | Rosencrants et al. | Aug. 27, 1940 |
| 2,535,730 | Gadret | Dec. 26, 1950 |
| 2,702,235 | Hochmuth | Feb. 15, 1955 |
| 2,747,552 | Kyrklund | May 29, 1956 |
| 2,773,026 | Cederquist | Dec. 4, 1956 |